United States Patent
Lu et al.

(10) Patent No.: US 12,179,286 B2
(45) Date of Patent: Dec. 31, 2024

(54) METHOD OF STRENGTHENING THROUGH REAL-TIME COUPLING OF ELECTRICAL PULSES AND LASER SHOCK WAVES

(71) Applicant: JIANGSU UNIVERSITY, Zhenjiang (CN)

(72) Inventors: Jinzhong Lu, Zhenjiang (CN); Weiwei Deng, Zhenjiang (CN); Kaiyu Luo, Zhenjiang (CN); Haifei Lu, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/034,079

(22) PCT Filed: Jul. 26, 2022

(86) PCT No.: PCT/CN2022/107739
§ 371 (c)(1),
(2) Date: Apr. 27, 2023

(87) PCT Pub. No.: WO2023/184798
PCT Pub. Date: Oct. 5, 2023

(65) Prior Publication Data
US 2024/0261903 A1    Aug. 8, 2024

(30) Foreign Application Priority Data
Mar. 31, 2022   (CN) .......................... 202210329375.7

(51) Int. Cl.
*B23K 26/356*     (2014.01)
*B23K 26/00*     (2014.01)
(Continued)

(52) U.S. Cl.
CPC ........ *B23K 26/356* (2015.10); *B23K 26/0006* (2013.01); *B23K 26/0622* (2015.10); *C21D 10/005* (2013.01)

(58) Field of Classification Search
CPC .............. B23K 26/356; B23K 26/0622; B23K 26/0624; B23K 26/0006; C21D 10/005
(Continued)

(56) References Cited

FOREIGN PATENT DOCUMENTS

| CN | 103911505 A | * | 7/2014 |
|---|---|---|---|
| CN | 111748811 A | | 10/2020 |

(Continued)

*Primary Examiner* — Nathaniel E Wiehe
*Assistant Examiner* — Alba T Rosario-Aponte
(74) *Attorney, Agent, or Firm* — Bayramoglu Law Offices LLC

(57) ABSTRACT

A method of strengthening through real-time coupling of electrical pulses and laser shock waves is provided. The initial time and duration of the electrical pulses are controlled to be matched with the initial time and duration of the laser shock waves, so that the electrical pulses and the laser shock waves are coupled in real time for material strengthening, the plasticity and the strength of the material are greatly improved, and a large area of the workpiece is uniformly strengthened. By simultaneously introducing the electrical pulses into the pulse current-assisted LSP, a great strengthening effect is achieved through the combination of the electrical pulses and the pulse current-assisted LSP in a short time, thereby reducing the internal defects of the material to a certain extent and further increasing the fatigue life of the material.

7 Claims, 2 Drawing Sheets

(51) Int. Cl.
*B23K 26/0622* (2014.01)
*C21D 10/00* (2006.01)

(58) Field of Classification Search
USPC .............................................. 219/121.85, 128
See application file for complete search history.

(56) References Cited

FOREIGN PATENT DOCUMENTS

| | | | | | |
|---|---|---|---|---|---|
| CN | 111822578 | A | | 10/2020 | |
| CN | 112662975 | A | | 4/2021 | |
| CN | 112853086 | A | | 5/2021 | |
| CN | 112981089 | A | * | 6/2021 | ........... C21D 10/005 |
| CN | 113151665 | A | * | 7/2021 | ........... C21D 10/005 |
| CN | 114686676 | A | | 7/2022 | |
| RU | 2126841 | C1 | | 2/1999 | |

\* cited by examiner

METHOD OF STRENGTHENING THROUGH REAL-TIME COUPLING OF ELECTRICAL PULSES AND LASER SHOCK WAVES

CROSS REFERENCE TO THE RELATED APPLICATIONS

This application is the national phase entry of International Application No. PCT/CN2022/107739, filed on Jul. 26, 2022, which is based upon and claims priority to Chinese Patent Application No. 202210329375.7, filed on Mar. 31, 2022, the entire contents of which are incorporated herein by reference.

TECHNICAL FIELD

The present disclosure relates to the technical field of laser shock peening/processing (LSP), and in particular, to a method of strengthening through real-time coupling of electrical pulses and laser shock waves.

BACKGROUND

Laser shock peening/processing (LSP) is to form shock waves on the surface of a material by using laser beams to improve the fatigue resistance of the material. Although systematic researches have been carried out in China and abroad on the manufacturing science and key technologies about fatigue resistance of aerospace components with laser shock waves and great progress has been made in scientific frontiers and engineering applications in the last 20 years, shock waves induced by laser beams still face enormous challenges and problems, for example, large-area overlapping LSP increases the surface roughness of the material and raises the risk of stress concentration; the compressive residual stress layer on the surface of the workpiece is thin and the grain refinement degree is low.

As a new type of strengthening technology, electrical pulses have been widely used in the current researches of material forming and strengthening. Electric current can improve the formability and plasticity of materials by reducing the flow stress, which is called electroplasticity. Researches also show that, the pulse current plays an important role in crack healing of the materials and the LSP plays an important role in the improvement of the fatigue resistance of the materials; therefore, the current-assisted LSP has obvious advantages in fatigue resistance.

At present, Chinese Patent CN12853086A proposes a method and a device of strengthening a metal material through pulse current coupled laser peening, where the pulse current assists the laser shock waves to work and the electrical pulse parameters are optimized, so that the LSP is performed with the optimal electrical pulse parameters and the effect of strengthening is effectively improved. However, since the relationship between the electrical pulses and the laser shock waves is undefined, it is impossible to ensure the synchronization of the electrical pulses and the single pulses of the laser shock waves. Therefore, this invention cannot realize real-time coupling of the electrical pulses and the laser shock waves and thus cannot ensure the stability and the uniformity of the effect of the pulse current-assisted LSP.

In view of the above, to eliminate the defects of the existing LSP and to improve the uniformity of the effect of the pulse current-assisted LSP, the present disclosure proposes a method of strengthening through real-time coupling of electrical pulses and laser shock waves, which can effectively improve the mechanical properties of the material, increase the degree of surface nanocrystallization of the material, and make it possible to develop large-area uniform strengthening in industrial applications.

SUMMARY

To solve the above problems, the present disclosure proposes a method of strengthening through real-time coupling of electrical pulses and laser shock waves, where the initial time of the electrical pulses and the initial time of the laser shock waves, the frequency of the electrical pulses and the frequency of the laser, and the moving speed of the workpiece are adjusted to be matched with one another, so that the electrical pulses and the laser shock waves are coupled in real time to greatly improve the strength and plasticity of the workpiece.

The present disclosure achieves the above objective through the following technical means.

A method of strengthening through real-time coupling of electrical pulses and laser shock waves is provided, where an initial time and a duration of the electrical pulses, an initial time and a duration of laser beams produced by a laser, and a moving speed of a workpiece are adjusted to be matched with one another, so that the electrical pulses and the laser shock waves are coupled in real time for strengthening to greatly improve strength and plasticity of the workpiece, the method specifically including the following steps:

(1) adjusting a waveform of the electrical pulses;

(2) adjusting a frequency of the electrical pulses and a frequency of the laser respectively to $f_1$ and $f_2$, where $f_1 = m^* f_2$;

(3) adjusting a pulse width of the electrical pulses and a pulse width of the laser respectively to $\tau_1$ and $\tau_2$, where $\tau_1 > \tau_2$;

(4) adjusting parameters of the electrical pulses, including adjusting a current amplitude to $I_0$, a full width at half maximum (FWHM) to $\tau_3$, and a current value to $I_0/2$ at $t_1$ and $t_4$;

(5) starting the electrical pulses first, and then turning on the laser at $t_2$ to produce the laser shock waves, where $t_2 \geq t_1$ and $t_2 \leq t_4 - 6\tau_2$; and (6) performing laser shock peening/processing (LSP) with the laser shock waves from a start point and meanwhile, moving the workpiece along a set LSP path to an end point at a speed of $V = D^* f_2^* (1-p\%)$; turning off the laser when the LSP at the end point is completed; and turning off an electrical pulse generator so that the LSP process is finished, where D is a diameter of an LSP round spot or a side length of an LSP square spot, and p % is an overlapping rate of the spot.

Further, in the step (1), the electrical pulses are produced by direct current, the waveform of the electrical pulses is half-sine, triangular, or rectangular, and the current and time satisfy the following relationship:

$$X(t) = \begin{cases} g(t) & n\frac{1}{f_1} \leq t \leq n\frac{1}{f_1} + \tau_1 \\ 0 & n\frac{1}{f_1} + \tau_1 < t < (n+1)\frac{1}{f_1} \end{cases},$$

where $n \geq 0$ and n is an integer; X(t) is a function of the current with respect to the time and is measured in A, t is the duration of the electrical pulses and is measured in t, g(t) is a functional expression of X(t) at a high level, $f_1$ is the frequency of the electrical pulses, and $\tau_1$ is the pulse width of the electrical pulses.

In the step (2), $f_1 \leq 1000$ Hz, $f_2 \leq 10$ Hz, $m \geq 1$, and m is an integer.

In the step (3), $\tau_1 \leq 5000$ s and $\tau_2 \leq 30$ ns.

In the step (4), $t_1$ and $t_4$ are two different moments of $X(t)=I_0/2$ in one cycle, $t_1$ and $t_4$ satisfy $t_4=t_1+\tau_3$, and if there is no solution, $t_1=nf^{-1}$ and $t_4=nf^{-1}\tau_1$, where $n \geq 0$ and n is an integer.

Further, an LSP confinement layer made of glycerin is adopted; and a two-layer absorption layer is provided, where an inner layer is made of a high-temperature-resistant insulating adhesive, and an outer layer is made of aluminum foil.

Further, in the step (4), other parameters of the electrical pulses include: 0 A≤the current amplitude≤5000 A and 0 V≤voltage amplitude≤12 V; and other parameters of the laser shock waves include: energy density selected according to a material.

The present disclosure has the following advantages.

1. The initial time and duration of the electrical pulses are controlled to be matched with the initial time and duration of the laser shock waves, so that the electrical pulses and the laser shock waves are coupled in real time for material strengthening, the plasticity and the strength of the material are greatly improved, and a large area of the workpiece is uniformly strengthened.
2. By introducing the electrical pulses into the pulse current-assisted LSP, a great strengthening effect is achieved through the combination of the electrical pulses and the pulse current-assisted LSP in a short time, thereby reducing the internal defects of the material to a certain extent and further increasing the fatigue life of the material.

Therefore, according to the method of strengthening through real-time coupling of electrical pulses and laser shock waves, the plasticity of the material is improved while the material is strengthened, so that the plasticity and the strength of the material are both improved. Meanwhile, a compressive residual stress layer deeper from the surface of the material is provided to further improve the fatigue resistance and corrosion resistance of the material.

BRIEF DESCRIPTION OF THE DRAWINGS

To illustrate the technical solutions in the embodiments of the present application or in the prior art more clearly, the accompanying drawings required for the description of the embodiments or the prior art are introduced briefly in the following.

Table 1 shows surface hardness of samples S0, S1, and S2.

Figure 1:
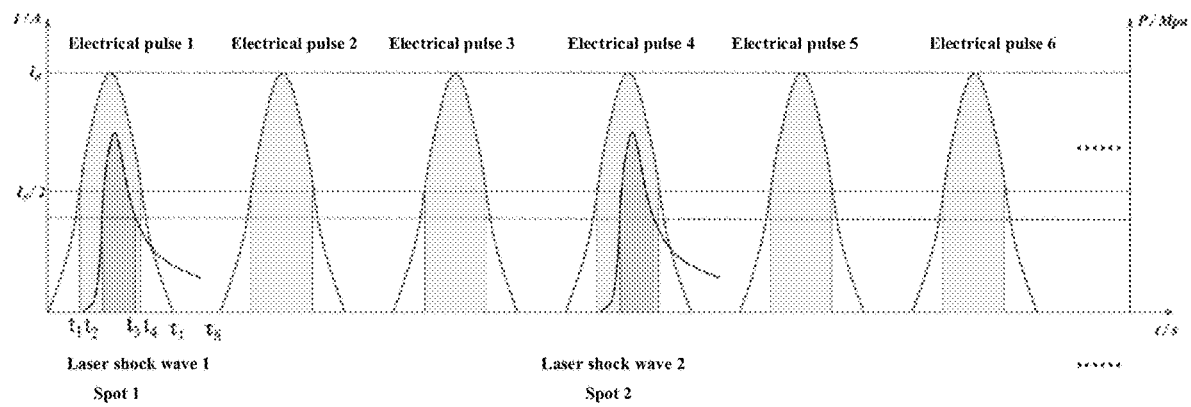
FIG. 1 shows distribution of pulse current and laser shock waves coupled in real time according to the present disclosure.
Figure 2:
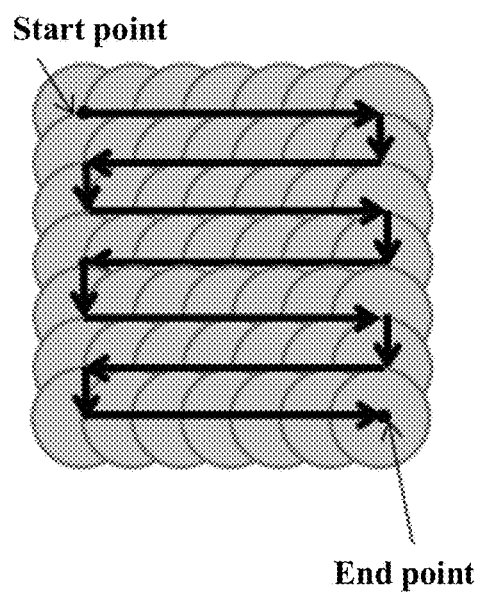
FIG. 2 shows an LSP path.
Figure 3:
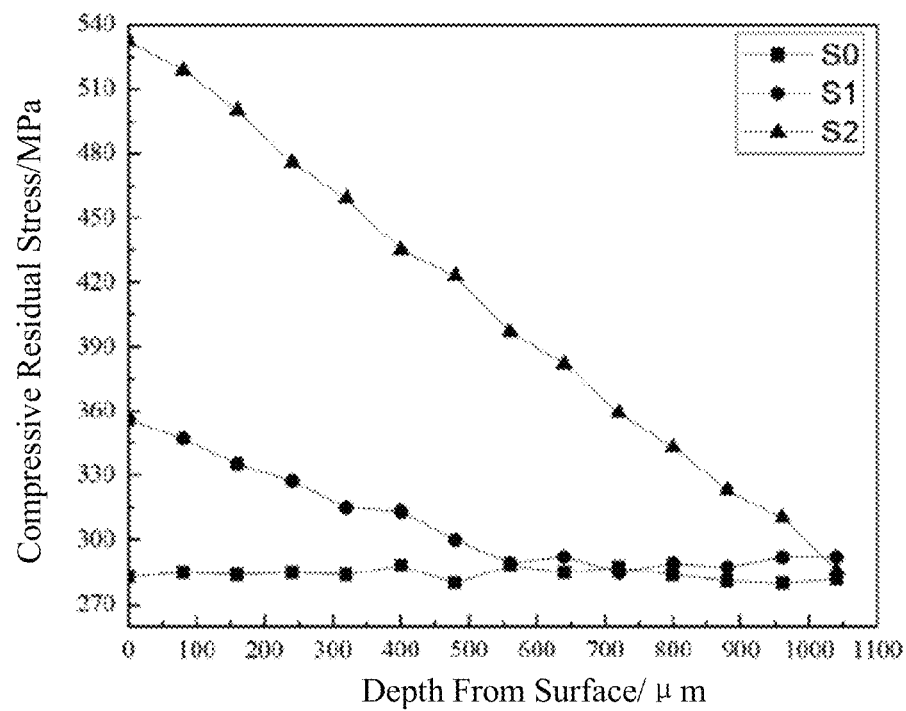

FIG. 3 shows compressive residual stress of the samples S0, S1, and S2 at different depths from surface.

DETAILED DESCRIPTION OF THE EMBODIMENTS

The specific implementations of the present disclosure are described in detail below with reference to the accompanying drawings and embodiments, but the present disclosure is not limited thereto.

A cuboid sample substrate of 50×50×5 mm³ is adopted in this embodiment and the cuboid sample substrate is made of TA2 pure titanium.

A specific embodiment of a method of strengthening through real-time coupling of electrical pulses and laser shock waves is described as follows.

A method of real-time alternation of electrical pulses and laser shock waves is provided, where an initial time and a duration of the electrical pulses, an initial time and a duration of laser beams produced by a laser, and a moving speed of a workpiece are adjusted to be matched with one another, so that the electrical pulses and the laser shock waves alternate in real time to greatly improve the strength and plasticity of the workpiece. The method specifically includes the following steps.

(1) The waveform of the electrical pulses is adjusted to be half-sine.
(2) The frequency of the electrical pulses and the frequency of the laser are respectively adjusted to $f_1=500$ Hz and $f_2=5$ Hz, where $f_1=100*f_2$.
(3) The pulse width of the electrical pulses and the pulse width of the laser are respectively adjusted to $\tau_1=1000$ s and $\tau_2=10$ ns.
(4) The parameters of the electrical pulses are adjusted such that the current amplitude is $I_0=4000$ A, and the following formula is satisfied:

$$X(t) = \begin{cases} 4000\sin(1000\,\pi t) & \frac{1}{500}n \leq t \leq \frac{1}{500}n + \frac{1}{1000} \\ 0 & \frac{1}{500}n + \frac{1}{1000} < t < \frac{1}{500}(n+1) \end{cases},$$

the full width at half maximum (FWHM) is $\tau_3=2/3000$ s, and the current value is $I_0/2$ at $t_1=1/6000+1/500$ ns and $t_4=5/6000+1/500$ ns.

(5) The LSP spot is a round spot with D=3 mm, an overlapping rate of 50%, and energy of 5 GW/cm². A confinement layer made of glycerin is adopted. A two-layer absorption layer is provided, where an inner layer is made of a high-temperature-resistant insulating adhesive, and an outer layer is made of aluminum foil. The LSP device is turned on at $t_2=1/3000$ s.
(6) The LSP device works from the start point, and meanwhile, the workpiece moves along the LSP path to the end point at a speed of V=7.5 mm/s. The LSP device is turned off when the processing at the end point is completed, the electrical pulse generator is then turned off, and the LSP process is finished.

Table 1 shows surface hardness of samples S0, S1, and S2, where S0 is an original sample, S1 is a sample after LSP, and S2 is a sample strengthened through real-time coupling of the electrical pulses and the laser shock waves. As shown in Table 1, the surface hardness of S0 is 188 HV, the surface hardness of S1 is 209 HV, and the surface hardness of S2 is 245 HV. The surface hardness of S1 is 21 HV higher than that of S0, which is increased by about 11%; the surface hardness of S2 is 65 HV higher than that of S1, which is increased by about 17%; and the surface hardness of S2 is increased by about 30% over S0. The surface hardness of the sample strengthened through real-time coupling of the electrical pulses and the laser shock waves is significantly improved as compared with that of the sample after LSP. Therefore, the real-time coupling of the electrical pulses and the laser shock waves can greatly improve the surface hardness of the material.

FIG. 3 shows compressive residual stress of the samples S0, S1, and S2 at different depths from surface. It can be seen from FIG. 3 that, the compressive residual stress on and below the surface of the sample S0 fluctuates around 285

MPa; the compressive residual stress on the surface of the sample S1 is 356 MPa and the compressive residual stress at a depth of 720 m from the surface is about 285 MPa which is basically the same as that of the unprocessed sample; and the compressive residual stress on the surface of S2 is 532 MPa and the compressive residual stress at a depth of 1040 m from the surface is about 286 MPa which is the same as that of the unprocessed sample. Therefore, the sample strengthened through real-time coupling of the electrical pulses and the laser shock waves has much higher surface compressive residual stress than the sample after LSP, and its compressive residual stress layer is much thicker than that of the sample after LSP.

TABLE 1

Surface hardness of the samples S0, S1, and S2

| Sample | Hardness/HV |
| --- | --- |
| S0 (original sample) | 188 |
| S1 (sample after LSP) | 209 |
| S2 (sample strengthened through real-time coupling of the electrical pulses and the laser shock waves) | 245 |

Hence, the present disclosure provides the method of strengthening through real-time coupling of the electrical pulses and the laser shock waves, so that the electric current and the laser shock waves can be coupled in real time to induce a deeper compressive residual stress layer, thereby further improving the mechanical property of hardness and the fatigue resistance of the material.

What is claimed is:

1. A method of strengthening through real-time coupling of electrical pulses and laser shock waves, wherein an initial time and a duration of the electrical pulses, an initial time and a duration of laser beams produced by a laser, and a moving speed of a workpiece are adjusted to be matched with one another, so that the electrical pulses and the laser shock waves are coupled in real time for strengthening to greatly improve strength and plasticity of the workpiece, and the method specifically comprises the following steps:

(1) adjusting a waveform of the electrical pulses;
(2) adjusting a frequency of the electrical pulses and a frequency of the laser respectively to $f_1$ and $f_2$, wherein $f_1 = m \ast f_2$, wherein m is an integer;
(3) adjusting a pulse width of the electrical pulses and a pulse width of the laser respectively to $\tau_1$ and $\tau_2$, wherein $\tau_1 > \tau_2$;
(4) adjusting parameters of the electrical pulses, comprising adjusting a current amplitude to $I_0$, a full width at half maximum (FWHM) to $\tau_3$, and a current value to $I_0/2$ at $\tau_1$ and $\tau_4$;
(5) starting the electrical pulses first, and then turning on the laser at $\tau_2$ to produce the laser shock waves, wherein $\tau_2 \geq \tau_1$ and $\tau_2 \leq \tau_4 - 6\tau_2$; and
(6) performing laser shock peening/processing (LSP) with the laser shock waves from a start point and meanwhile, moving the workpiece along a set LSP path to an end point at a speed of $V = D \ast f_2 \ast (1-p\%)$; turning off the laser when the LSP at the end point is completed; and turning off an electrical pulse generator so that the LSP process is finished, wherein D is a diameter of an LSP round spot or a side length of an LSP square spot, and p % is an overlapping rate of the spot.

2. The method of strengthening through real-time coupling of electrical pulses and laser shock waves according to claim 1, wherein in the step (1), the electrical pulses are produced by a direct current, the waveform of the electrical pulses is half-sine, triangular, or rectangular, and the current and time satisfy the following relationship:

$$X(t) = \begin{cases} g(t) & n\dfrac{1}{f_1} \leq t \leq n\dfrac{1}{f_1} + \tau_1 \\ 0 & n\dfrac{1}{f_1} + \tau_1 < t < (n+1)\dfrac{1}{f_1} \end{cases},$$

wherein $n \geq 0$ and n is an integer; X(t) is a function of the current with respect to the time and is measured in A, t is the duration of the electrical pulses and is measured in s, wherein s represents seconds, g(t) is a functional expression of X(t) at a high level, $f_1$ is the frequency of the electrical pulses, and $\tau_1$ is the pulse width of the electrical pulses.

3. The method of strengthening through real-time coupling of electrical pulses and laser shock waves according to claim 1, wherein in the step (2), $f_1 \leq 1000$ Hz, $f_2 \leq 10$ Hz, $m \geq 1$, and m is an integer.

4. The method of strengthening through real-time coupling of electrical pulses and laser shock waves according to claim 1, wherein in the step (3), $\tau_1 \leq 5000$ μs and $\tau_2 \leq 30$ ns.

5. The method of strengthening through real-time coupling of electrical pulses and laser shock waves according to claim 1, wherein in the step (4), $\tau_1$ and ta are two different moments of $X(t) = I_0/2$ in one cycle, $t_1$ and $t_4$ satisfy $t_4 = t_1 + t_3$, and if there is no solution, $t_1 = nf^{-1}$ and $t_4 = nf^{-1} + \tau_1$, wherein $n \geq 0$ and n is an integer.

6. The method of strengthening through real-time coupling of electrical pulses and laser shock waves according to claim 1, wherein an LSP confinement layer made of glycerin is adopted; and a two-layer absorption layer is provided, wherein an inner layer is made of a high-temperature-resistant insulating adhesive, and an outer layer is made of aluminum foil.

7. The method of strengthening through real-time coupling of electrical pulses and laser shock waves according to claim 1, wherein in the step (4), other parameters of the electrical pulses comprise: $0 A \leq$ the current amplitude $\leq 5000$ A and $0 V \leq$ a voltage amplitude $\leq 12$ V; and other parameters of the laser shock waves comprise: an energy density selected according to a material.

* * * * *